March 26, 1929.  H. S. BOSTICK  1,707,074
METAL WEATHER STRIP
Filed Feb. 20, 1928
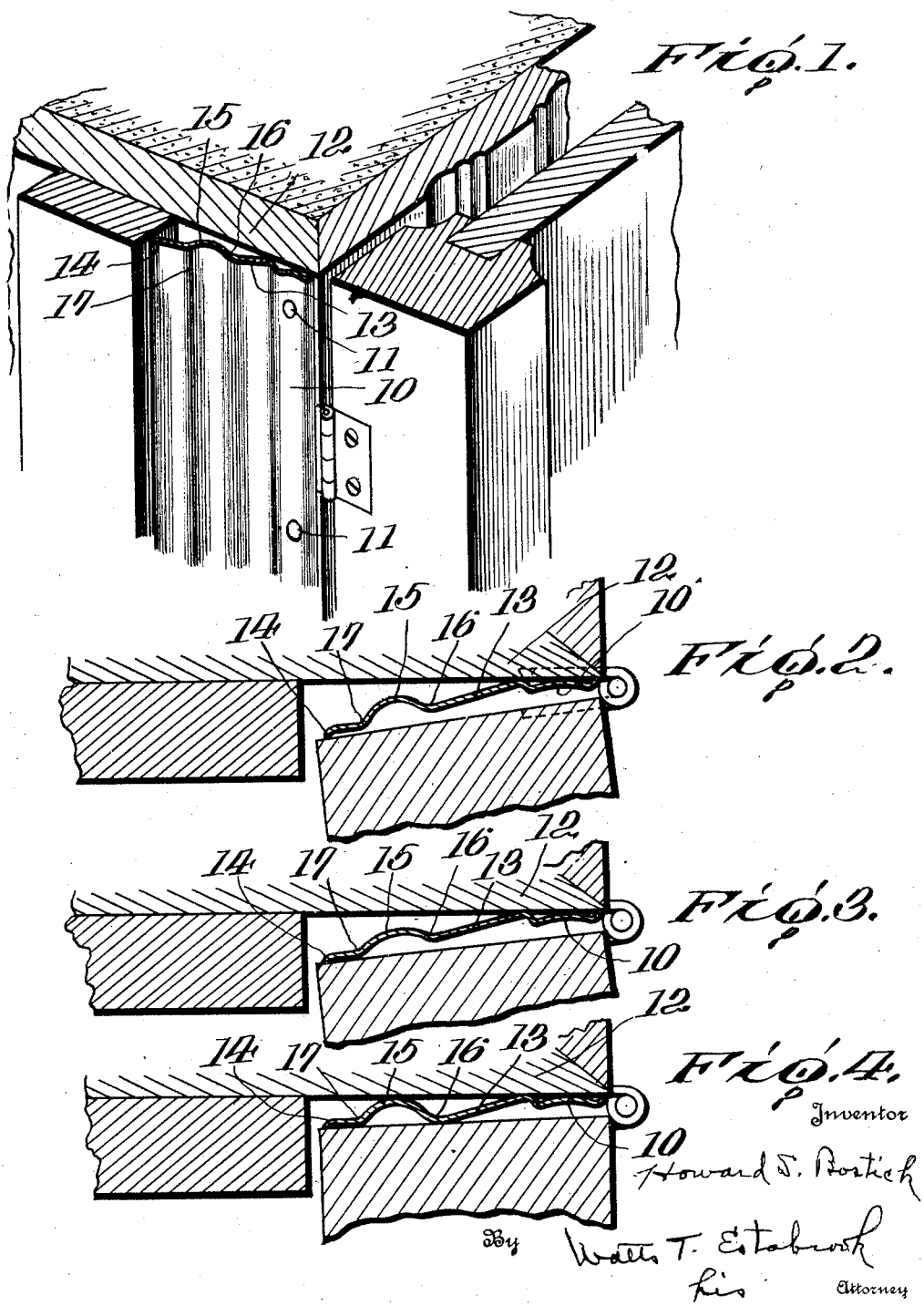

Patented Mar. 26, 1929.

1,707,074

UNITED STATES PATENT OFFICE.

HOWARD S. BOSTICK, OF DREXEL HILL, PENNSYLVANIA, ASSIGNOR TO JAMES B. BRENEMAN AND WILLIAM E. BOSTICK, BOTH OF PHILADELPHIA, PENNSYLVANIA.

METAL WEATHER STRIP.

Application filed February 20, 1928. Serial No. 255,833.

This invention relates to an improvement in metal weather strips and is particularly adapted for doorways and swinging window sash.

The invention consists of a metal strip of resilient material having one edge thereof constructed and adapted for attaching the strip to the jamb of a door, and from this edge the strip is bent at an obtuse angle. A longitudinal groove is formed in the strip producing engaging portions along its longitudinal edges and from the outermost edge of this groove the strip projects at an angle with the outer edge thereof having a slight upward curvature. By constructing the strip in this manner the door stile as the door is swung to closed position will first engage the upwardly curved edge of the weather strip, and then due to the flexing of the strip engagement between the strip and stile will be created from the curved portion of the strip to the outer edge of the groove, and finally engagement will be made between the inner edge of the groove to provide a plurality of contacting surfaces between the stile and the strip and preventing the ingress of moisture, dust and foreign matter between the jamb and stile of the door.

The invention consists of certain novel features of construction and combinations of parts which will be hereinafter described and pointed out in the claim.

In the accompanying drawing:

Figure 1 is a detail perspective view showing the application of the invention to the jamb of a door, Figure 2 is a horizontal sectional view showing the position of the weather stripping and the door as the door is swung into engagement with the stripping;

Figure 3 is a similar view showing the engagement between the strip and door stile as the door is being swung to closed position; and Figure 4 is a similar view showing the position assumed by the strip when the door is in closed position.

The metal weather strip is made of a thin piece of sheet brass, copper or other suitable resilient material formed by any suitable means to produce along one longitudinal edge a comparatively flat portion 10, through which nails or other fastening means 11, are driven for securing the strip to the jamb 12, of the door frame. From the inner edge of this flat surface the strip is bent upwardly at an obtuse angle, as at 13, with the outer edge bent or curved outwardly as at 14. Formed in this inclined or obtuse angular portion near the outer edge thereof is a longitudinal groove or corrugation 15, which groove or corrugation curves inwardly toward the jamb 11, producing at the edges thereof shoulders or beads 16 and 17.

The portion of the strip between the bead or shoulder 17, and the outer or curved edge 14, of the strip is formed at an obtuse angle with respect to the flat or nailing portion 10 but lies in a lower plane than the obtuse angular plane surface 13. Therefore the angular portion 13 of the strip is not in alignment with the portion located between the bead 17 and the outer curved portion 14 of the strip.

When the door 18 is swung to closed position the stile 19 thereof will contact at its outer edge first with the curved edge 14 of the strip and as the door continues to swing to closed position further contact will be made with the bead 17 and the strip or portion between the edge 14 and the bead or shoulder 17 due to the flexing of the strip, as clearly illustrated in Figure 3. As the door is continued to be moved to closed position the strip will be further flexed until the shoulder or bead 16 is engaged by the door. It will therefore be seen that a contacting surface is obtained between the stile and strip throughout the portion of the strip formed between the curved portion 14 and the bead or shoulder 17, and with the bead or shoulder 16 of the strip thereby producing a plurality of contacting or engaging surfaces which will prevent ingress of moisture between the strip and stile as well as any foreign matter.

This multiple contact which is had between the strip and the door stile is caused by the flexing of the strip and the groove or corrugation 15 which affords the necessary rigidity to cause the shoulder or bead 16 to be brought into engagement with the door stile as the door is swung to closed position.

Having described my invention what I claim as new and desire to secure by Letters Patent is:

The combination with a door jamb and a door hinged thereto, of a resilient metal weather strip attached to the door jamb along one edge of said strip, and bent therefrom at an obtuse angle, said strip provided with a longitudinal groove in said angle portion, said groove having shoulders formed at each edge with the shoulder adjacent the free edge of the strip projecting fartherest away from the door jamb, said door when swung into engagement with the strip first engaging the shoulder at the free edge of the strip and as the door is swung to closed position will cause a flexing of the strip to bring the other shoulder into engagement with the door.

HOWARD S. BOSTICK.